United States Patent [19]

Mitchell et al.

[11] 3,944,482

[45] Mar. 16, 1976

[54] PROCESS FOR THE CRACKING OF HIGH METALS CONTENT FEEDSTOCKS

[75] Inventors: Bruce R. Mitchell, Sarver; Harold E. Swift, Gibsonia, both of Pa.

[73] Assignee: Gulf Research & Development Company, Pittsburgh, Pa.

[22] Filed: Apr. 10, 1974

[21] Appl. No.: 459,534

Related U.S. Application Data

[63] Continuation-in-part of Ser. No. 386,719, Aug. 8, 1973, abandoned.

[52] U.S. Cl. ............. 208/120; 208/111; 208/251 R; 252/455 Z
[51] Int. Cl.² .................... C10G 11/04; B01J 29/12
[58] Field of Search ................ 208/120, 111, 251 R

[56] References Cited
UNITED STATES PATENTS

| | | |
|---|---|---|
| 2,890,162 | 6/1959 | Anderson et al. ..................... 208/46 |
| 3,140,249 | 7/1964 | Plank et al. .......................... 208/120 |
| 3,140,253 | 7/1964 | Plank et al. .......................... 208/120 |
| 3,271,418 | 9/1966 | Plank et al. .......................... 208/120 |
| 3,393,148 | 7/1968 | Bertolacini et al. ................. 208/264 |
| 3,657,154 | 4/1972 | Haden et al. ..................... 252/455 Z |
| 3,660,274 | 5/1972 | Blazek et al. ........................ 208/120 |
| 3,676,330 | 7/1972 | Plank et al. .......................... 208/111 |
| 3,775,299 | 11/1973 | Hepner .............................. 208/120 |
| 3,816,342 | 6/1974 | Plank et al. ..................... 252/455 Z |

*Primary Examiner*—Delbert E. Gantz
*Assistant Examiner*—G. E. Schmitkons

[57] ABSTRACT

The cracking of high metals content feedstocks is achieved in the presence of a catalyst comprising from 1 to 40 weight percent of a zeolite having cracking activity dispersed in a large pored matrix.

29 Claims, 10 Drawing Figures

FOR 12% RARE EARTH EXCHANGED Y-ZEOLITE IN MATRIX G

Ni EQUIVALENTS, ppm

For 12% Rare Earth Exchanged Y-Zeolite in Matrix A

FIGURE 4
For 12 % Rare Earth Exchanged Y-Zeolite in Matrix B

FIGURE 5
For 22% Rare Earth Exchanged Y-Zeolite in Matrix C

Ni Equivalents, ppm

FIGURE 6

For 12% Rare Earth Exchanged Y-Zeolite in Matrix D

FIGURE 7
For 12% Rare Earth Exchanged Y-Zeolite in Matrix E

FIGURE 8
For 12 and 22% Rare Earth Exchanged Y-Zeolite in Matrix F

Fig. 10

COMPARISON OF PURE MATRIX D TO MATRIX D CONTAINING 12% RARE EARTH EXCHANGED Y-ZEOLITE

PROCESS FOR THE CRACKING OF HIGH METALS CONTENT FEEDSTOCKS

RELATED APPLICATION

This is a continuation-in-part application of U.S. Ser. No. 386,719 (now abandoned) filed Aug. 8, 1973, and assigned to the same assignee as the present application.

The present invention relates to the catalytic cracking of hydrocarbonaceous feeds containing metals and in particular to the cracking of these feeds with fluid catalysts which have improved metals tolerant characteristics.

There is a continually increasing demand for gasolines, coupled with shrinking supplies of normally used cracking stocks, such as gas oils. As a result, more attention has recently been directed to the catalytic cracking of heavier charge stocks such as residuals. One of the primary problems with these stocks is their high metals content which tends to deposit on the catalyst and decrease its desirable cracking characteristics. The term "metals" in this application refers to free metals or relatively non-volatile metal compounds. Many petroleum charge stocks contain at least traces of many metals and in addition to the metals which are naturally present, petroleum stocks have a tendency to pick up iron because of transportation, storage and processing in iron equipment. Substantially all of the metals are present in an organo-metallo form, such as, for example, in a porphyrin ring or as a naphthenate. The metals in the petroleum charge stock tend to deposit in a relatively non-volatile form onto the catalyst during the cracking process, and regeneration of the catalyst to remove coke does not remove these contaminants which have an adverse effect on cracking results when using conventional cracking catalysts. Examples of typical metals which can be present include: nickel, vanadium, copper, chromium, and iron. Further, the use of zeolitic cracking catalysts has become of increased importance due to the higher activity characteristics of these materials (see "Recycle Rates Reflect FCC Advances," by J. A. Montgomery, Oil & Gas Journal, Dec. 11, 1972, pp. 81–86). Unfortunately, these zeolitic catalysts are also susceptible to metals poisoning.

Of course, a number of methods have been proposed in the past to overcome the problems associated with the cracking of metals contaminated feedstocks. Suggestions have been made to pretreat the contaminated feed to reduce the content of metals to below about 1 to 4 parts per million by volume. Feeds have also been carefully fractionated to exclude the heavier gas oils and residue materials where the major metal contaminants are concentrated. Still other techniques are directed to removing the metal contaminants once they have been deposited on the catalyst. Most of these techniques, however, require expensive additional equipment and chemicals which are not justified from an economic standpoint.

The above problems are overcome in accordance with the present invention by providing an improved metals tolerant cracking catalyst which incorporates in part the desirable higher activity characteristics of zeolites.

In accordance with the invention, an improved process for the catalytic cracking of a high metals content feedstock is achieved by cracking the feedstock in the absence of added hydrogen and in the presence of a catalyst comprising from 1 to 40 weight percent of a zeolite having cracking characteristics dispersed in a refractory metal oxide matrix having a pore size distribution such that less than 20 volume percent of the pores have a pore diameter of less than 50 A, and the average pore diameter is at least about 100 A. The new metals tolerant catalyst can be used in pellet form for a fixed-bed operation; powder form for fluid bed operation; or in bead form for a moving bed operation. The fluid bed operation is preferred. The improved metals tolerant catalyst composition of this invention comprises as one component a crystalline aluminosilicate, preferably exchanged with rare earth metal cations. This crystalline aluminosilicate, sometimes referred to as the "rare earth zeolite," is dispersed in a large pore refractory metal oxide matrix. Catalysts comprising a crystalline aluminosilicate zeolite dispersed in a refractory metal oxide matrix are disclosed, for example, in U.S. Pat. Nos. 3,140,249 and 3,140,253 to C. J. Plank and E. J. Rosinki.

Typical zeolites or molecular sieves having cracking activity which can be suitably dispersed in a matrix for use as a catalytic cracking catalyst are well known in the art. Suitable zeolites are described, for example, in U.S. Pat. No. 3,660,274 to James J. Blazek et al. The description of the crystalline aluminosilicates in the Blazek et al patent is incorporated herein by reference. Synthetically prepared zeolites are intially in the form of alkali metal aluminosilicates. The alkali metal ions are exchanged with rare earth metal ions to impart cracking characteristics to the zeolites. The zeolites are, of course, crystalline, three-dimensional, stable structures containing a large number of uniform openings or cavities interconnected by smaller, relatively uniform holes or channels. The effective pore size of synthetic zeolites is suitably between six and 15 A in diameter. The overall formula for the zeolites can be represented as follows:

$$xM_{2/n}O:Al_2O_3:1.5-6.5\ SiO_2:yH_2O$$

where M is a metal cation and n its valence and $x$ varies from 0 to 1 and $y$ is a function of the degree of dehydration and varies from 0 to 9. M is preferably a rare earth metal cation such as lanthanum, cerium, praseodymium, neodymium or mixtures of these.

Zeolites which can be employed in accordance with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. The faujasites are preferred. Suitable synthetic zeolites which can be treated in accordance with this invention include zeolites X, Y, A, L, ZK-4, B, E F, H J, M, Q, T, W, Z, alpha and beta, ZSM-types and omega. The term "zeolites" as used herein contemplates not only aluminosilicates but substances in which the aluminum is replaced by gallium and substances in which the silicon is replaced by germanium.

The preferred zeolites for this invention are the synthetic faujasites of the types Y and X or mixtures thereof.

It is also well known in the art that to obtain good cracking activity the zeolites have to be in a proper form. In most cases this involves reducing the alkali metal content of the zeolite to as low a level as possible. Further, a high alkali metal content reduces the thermal structural stability, and the effective lifetime of the catalyst will be impaired as a consequence thereof. Procedures for removing alkali metals and putting the zeolite in the proper form are well known in the art as described in U.S. Pat. No. 3,537,816.

The crystalline aluminosilicate zeolites, such as synthetic faujasite, will under normal conditions crystallize as regularly shaped, discrete particles of approximately one to ten microns in size, and, accordingly, this is the size range normally used in commercial catalysts. Preferably the particle size of the zeolites is from 0.5 to 10 microns and more preferably is from 1 to 2 microns or less. Crystalline zeolites exhibit both an interior and an exterior surface area, with the largest portion of the total surface area being internal. Blockage of the internal channels by, for example, coke formation and contamination by metals poisoning will greatly reduce the total surface area. Therefore, to minimize the effect of contamination and pore blockage, crystals larger than the normal size cited above are preferably not used in the catalysts of this invention.

It has now been discovered that when the above described zeolites are dispersed in a matrix material having defined large pore size characteristics, the resulting catalyst has unusually improved metals tolerant characteristics and can be utilized much more effectively in the catalytic cracking of high metals content hydrocarbonaceous feedstocks, such as residues or full crudes. While it is not certain, it is believed the metals from the charge stock deposit themselves in the large pores of the matrix rather than on the zeolitic catalyst sites, and thus the matrix sacrifices itself and prolongs the useful life of the catalytically active zeolitic material. The matrix material can suitably be formed from any refractory metal oxide or clay and is preferably formed from at least a portion of alumina. By a "portion" is meant greater than 25 percent by weight of alumina. Most preferably the matrix contains over 50 percent by weight of alumina. The remainder of the matrix material can be any other well known refractory metal oxide such as silica, magnesia, zirconia or mixtures of these materials or suitable large pore clays.

It is preferred that the matrix material be a substantially homogeneous refractory metal oxide or mixture of metal oxides which can be made in situ or made separately and thoroughly blended. The refractory metal oxides making up the matrix can be crystalline or amorphous or partially crystalline. It is within the ambit of this invention to include matrices of discrete portions of several refractory metal oxides, and in these instances it is preferred that each discrete portion of the matrix have the pore size distribution characteristics set forth herein. It is possible, of course, to incorporate small amounts of inert low average pore size refractory oxides in the matrix. The pore size distribution characteristics of the total matrix must, of course, conform to the limits set forth herein.

The particular method of forming the catalyst matrix does not form a part of this invention. Any method which produces the desired large pore size characteristics can suitably be employed. Large pored refractory metal oxide materials suitable for use as a matrix can be obtained as articles of commerce from catalyst manufacturers or they can be prepared in ways well known in the art such as described, for example, in U.S. Pat. No. 2,890,162, the specification of which is incorporated herein by reference.

Whatever matrix material is chosen and whatever method of preparation is employed, the resulting matrix material must contain relatively large pores. A suitable pore size distribution would be such that less than 20 volume percent of the pores have a pore diameter less than 50 A. In one preferred form, less than five volume percent of the pores have a pore diameter above 600 A. In addition, the matrix material must have an average pore diameter of at least 90 A and preferably the average pore diameter is at least 100 A. The upper limit for the average pore diameter is suitably about 350 A, although usually an upper limit of 275 A is satisfactory.

A suitable method of determining the average pore radius of a matrix material is by the BET method, described, for example, in S. Brunauer, "The Adsorption of Gases and Vapors," Vol. 1, Princeton University Press, 1943. The average pore diameter is, of course, a numerical value of twice the average pore radius.

For purposes of this invention, the determination of the average pore radii of the matrix material occurs after the fresh dried matrix material is calcined at 1000°F. in air for 10 hours. No other pretreatment should occur prior to determination of the average pore radii and the determination of the pore size distribution as defined above. It is recognized that other pretreatments or post-treatments such as steaming, the presence of a particular type of zeolite, and the amount of zeolite, will affect the average pore diameter of the matrix and the average pore diameter of the total composited material. Since average pore diameter is an additive function, the average pore diameter of a composited material made up of a large-pored matrix and a relatively small-pored zeolite will be adjusted according to the amounts and types of the zeolite and large-pored matrix portions. A proper correlation can be obtained by one having ordinary skill in the art between the amount and type of zeolite admixed with the large-pored matrix and the average pore radius of the final catalyst. Thus it is possible through routine experiments to correlate the decrease in the average pore radius of a final composited catalyst with the amount and type of zeolite incorporated therein. For example, for every 1 weight percent of a synthetic faujasite composited with a large-pored silica alumina matrix, a 1.3 percent decrease in average pore diameter of the finished catalyst was experienced. With such a correlation, back calculation of the average pore radius of the matrix can be obtained.

The amount of the zeolitic material to disperse in the matrix can suitably be from 1 to 40 weight percent, preferably 2 to 30 weight percent, and most preferably from 5 to 25 weight percent of the final catalyst. The method of forming the final composited catalyst also forms no part of this invention, and any method well known to those skilled in this art is acceptable. For example, finely divided zeolite can be admixed with the finely divided matrix material, and the mixture spray dried to form the final catalyst. Other suitable methods are described in U.S. Pat. Nos. 3,271,418; 3,717,587; 3,657,154; and 3,676,330; whose descriptions are incorporated herein by reference. The zeolite can also be grown on the matrix material if desired.

The above described composite catalysts have a high tolerance to metals and thus the catalyst compositions are particularly useful in the cracking of high metals content charge stocks. Suitable charge stocks include crude oil, residuums or other petroleum fractions which are suitable catalytic cracking charge stocks except for the high metals contents. A high metals content charge stock for purposes of the process of this invention is defined as one having a total metals concentration equivalent to or greater than a value of ten as calculated in accordance with the following relationship:

$$10[Ni] + [V] + [Fe] \geq 10 \qquad (I)$$

where [Ni], [V] and [Fe] are the concentrations of nickel, vanadium and iron, respectively, in parts per million by weight. It is to be understood that the catalyst compositions described above can be used in the catalytic cracking of any hydrocarbon charge stock containing metals, but is particularly useful for the treatment of high metals content charge stocks since the useful life of the catalyst is increased. The charge stocks can also be derived from coal, shale or tar sands. Thus charge stocks which have a metals content value of at least 10 in accordance with Equation I cannot be treated economically in commercial processes today due to high catalyst make-up rates, but can now be treated utilizing the catalyst compositions described above. Typical feedstocks are heavy gas oils or the heavier fractions of crude oil in which the metal contaminants are concentrated. Usually the charge stocks have a metals value of less than 5000 by Equation I although charge stocks having higher values can be used. Particularly preferred charge stocks for treatment by the process of this invention include deasphalted oils boiling above 900°F. (482°C.) at atmospheric pressure; heavy gas oils boiling from 650°F. to 1100°F. (343°C. to 593°C.) at atmospheric pressure; atmospheric or vacuum tower bottoms boiling above 650°F.

The preferred method of operating the process of this invention is by fluid catalytic cracking. Hydrogen is not added to the reaction.

Figure 1:
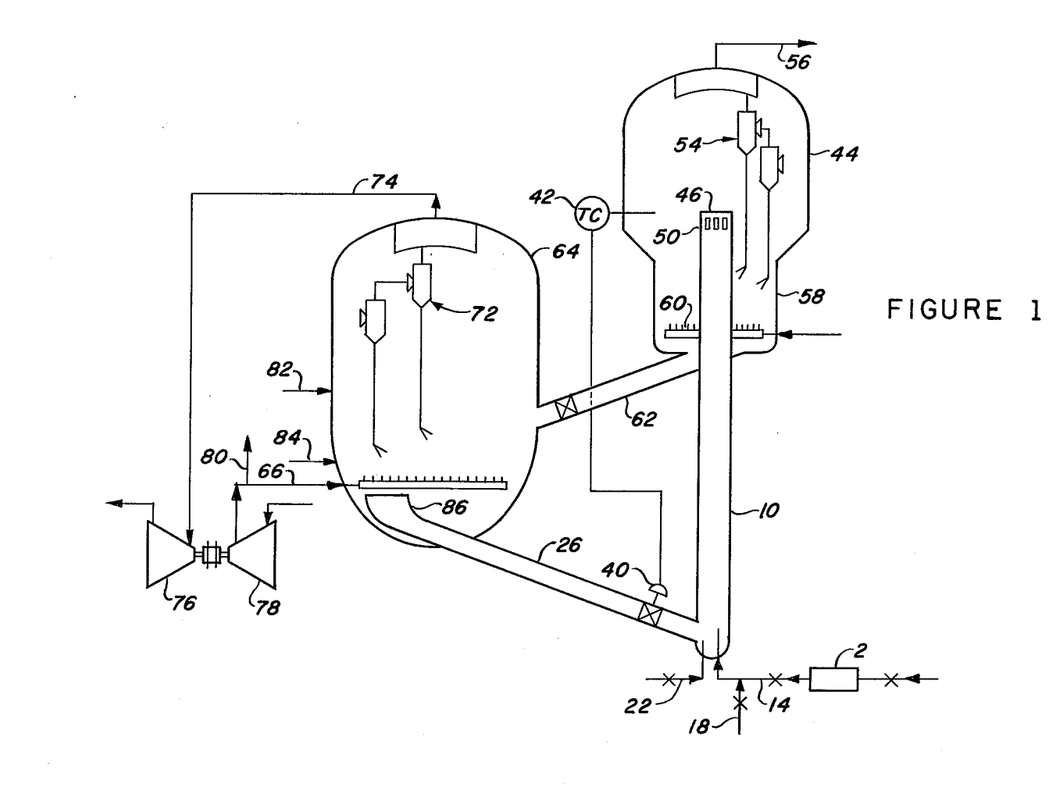
FIGS. 1–10, show a suitable reaction system and a series of graphs comparing the progression of conversions and product yields as metal contaminants built up in the catalyst particles comprising the several matrix materials.

A suitable reactor-regenerator system for performing this aspect of the invention is shown in the attached FIG. 1. The cracking occurs in the presence of a fluidized composited catalyst described above in an elongated reactor tube 10 which is referred to as a riser. The riser has a length to diameter ratio of above 20 or above 25. The charge stock to be cracked is passed through preheater 2 to heat it to about 600°F. (315.6°C.) and is then charged into the bottom of riser 10 to the end of line 14. Steam is introduced into oil inlet line 14 through line 18. Steam is also introduced independently to the bottom of riser 10 through line 22 to help carry upwardly into the riser regenerated catalyst which flows to the bottom of the riser through transfer line 26.

The oil charge to be cracked in the riser is, for example, a heavy gas oil having a boiling range of about 650°F. to 1100°F. The steam added to the riser can amount to about 10 weight percent based on the oil charge, but the amount of steam can vary widely. The catalyst employed is a composite zeolite — large pore matrix material in a fluid form and is added to the bottom of the riser. The riser temperature range is suitably about 900°F. to 1100°F. (482°C. to 593°C.) and is controlled by measuring the temperature of the product from the riser and then adjusting the opening of valve 40 by means of temperature controller 42 which regulates the inflow of hot regenerated catalyst to the bottom of riser 10. The temperature of the regenerated catalyst is above the control temperature in the riser so that the incoming catalyst contributes heat to the cracking reaction. The riser pressure is between about 10 and 35 psig. Between about 0 and 5 percent of the oil charge to the riser can be recycled. The residence time of both hydrocarbon and catalyst in the riser is very small and ranges from 0.5 to 5 seconds. The velocity through the riser is about 35 to 55 feet per second and is sufficiently high so that there is little or no slippage between the hydrocarbon and the catalyst flowing through the riser. Therefore no bed of catalyst is permitted to build up within the riser whereby the density within the riser is very low. The density within the riser is a maximum of about 4 pounds per cubic foot at the bottom of the riser and decreases to about 2 pounds per cubic foot at the top of the riser. Since no dense bed of catalyst is permitted to build up within the riser, the space velocity through the riser is unusually high and will have a range between 100 or 120 and 600 weight of hydrocarbon per hour per instantaneous weight of catalyst in the reactor. No significant catalyst buildup within the reactor is permitted to occur, and the instantaneous catalyst inventory within the riser is due to a flowing catalyst to oil weight ratio between about 4:1 and 15:1, the weight ratio corresponding to the feed ratio.

The hydrocarbon and catalyst exiting from the top of each riser is passed into a disengaging vessel 44. The top of the riser is capped at 46 so that discharge occurs through lateral slots 50 for proper dispersion. An instantaneous separation between hydrocarbon and catalyst occurs in the disengaging vessel. The hydrocarbon which separates from the catalyst is primarily gasoline together with some heavier components and some lighter gaseous components. The hydrocarbon effluent passes through cyclone system 54 to separate catalyst fines contained therein and is discharged to a fractionator through line 56. The catalyst separated from hydrocarbon in disengager 44 immediately drops below the outlets of the riser so that there is no catalyst level in the disengager but only in a lower stripper section 58. Steam is introduced into catalyst stripper section 58 through sparger 60 to remove any entrained hydrocarbon in the catalyst.

Catalyst leaving stripper 58 passes through transfer line 62 to a regenerator 64. This catalyst contains carbon deposits which tend to lower its cracking activity and as much carbon as possible must be burned from the surface of the catalyst. This burning is accomplished by introduction to the regenerator through line 66 of approximately the stoichiometrically required amount of air for combustion of the carbon deposits. The catalyst from the stripper enters the bottom section of the regenerator in a radial and downward direction through transfer line 62. Flue gas leaving the dense catalyst bed in regenerator 64 flows through cyclones 72 wherein catalyst fines are separated from flue gas permitting the flue gas to leave the regenerator through line 74 and pass through a turbine 76 before leaving for a waste heat boiler wherein any carbon monoxide contained in the flue gas is burned to carbon dioxide to accomplish heat recovery. Turbine 76 compresses atmospheric air in air compressor 78 and this air is charged to the bottom of the regenerator through line 66.

The temperature throughout the dense catalyst bed in the regenerator is about 1250°F. (676.7°C.). The temperature of the flue gas leaving the top of the catalyst bed in the regenerator can rise due to afterburning of carbon monoxide to carbon dioxide. Approximately a stoichiometric amount of oxygen is charged to the regenerator, and the reason for this is to minimize afterburning of carbon monoxide to carbon dioxide above the catalyst bed to avoid injury to the equipment, since at the temperature of the regenerator flue gas some afterburning does occur. In order to prevent excessively high temperatures in the regenerator flue gas due to afterburning, the temperature of the regenerator flue gas is controlled by measuring the temperature of the flue gas entering the cyclones and then venting some of the pressurized air otherwise destined to be charged to the bottom of the regenerator through vent line 80 in response to this measurement. The regenerator reduces the carbon content of the catalyst from 1 ± 0.5 weight percent to 0.2 weight percent or less. If required, steam is available through line 82 for cooling the regenerator. Makeup catalyst is added to the bottom of the regenerator through line 84. Hopper 86 is disposed at the bottom of the regenerator for receiving regenerated catalyst to be passed to the bottom of the reactor riser through transfer line 26.

The reaction temperature in accordance with the above described process is at least about 900°F. (482.2°C.). The upper limit can be about 1100°F. (593.3°C.) or more. The preferred temperature range is 950°F. to 1050°F. (510°C. to 565.6°C.). The reaction total pressure can vary widely and can be, for example, 5 to 50 psig (0.34 to 3.4 atmospheres), or preferably, 20 to 30 psig (1.36 to 2.04 atmospheres). The maximum residence time is 5 seconds, and for most charge stocks the residence time will be about 1.5 or 2.5 seconds or, less commonly, 3 or 4 seconds. For high molecular weight charge stocks, which are rich in aromatics, residence times of 0.5 to 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as 25 to 75 feet per second; and to this end a length to diameter ratio above 20 or 25 is suitable. The reactor can have a uniform diameter or can be provided with a continuous taper or a stepwise increase in diameter along the reaction path to maintain a nearly constant velocity along the flow path. The amount of diluent can vary depending upon the ratio of hydrocarbon to diluent desired for control purposes. If steam is the diluent employed, a typical amount to be charged can be about 10 percent by volume, which is about 1 percent by weight, based on hydrocarbon charge. A suitable but non-limiting proportion of diluent gas, such as steam or nitrogen, to fresh hydrocarbon feed can be 0.5 to 10 percent by weight.

The catalyst particle size must render it capable of fluidization as a disperse phase in the reactor. Typical and non-limiting fluid catalyst particle size characteristics are as follows:

Size (Microns) 0–20 20–45 45–75 >75
Weight percent 0–5 20–30 35–55 20–40

These particle sizes are usual and are not peculiar to this invention. A suitable weight ratio of catalyst to total oil charge is about 4:1 to about 12:1 to 15:1 or even 25:1, generally, or 6:1 to 10:1 preferably. The fresh hydrocarbon feed is generally preheated to a temperature of about 600°F. to 700°F. (316°C. to 371°C.) but is generally not vaporized during preheat, and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst the less catalyst is required to achieve a given reaction temperature. Therefore, a high regenerated catalyst temperature will permit the very low reactor density level set forth below and thereby help to avoid backmixing in the reactor. Generally catalyst regeneration can occur at an elevated temperature of about 1240°F. or 1250°F. (671.1°C. or 676.6°C.) or more to reduce the level of carbon on the regenerated catalyst from about 0.6 to 1.5 to about 0.05 to 0.3 percent by weight. At usual catalyst to oil ratios in the feed, the quantity of catalyst is more than ample to achieve the desired catalytic effect and therefore if the temperature of the catalyst is high, the ratio can be safely decreased without impairing conversion. Since zeolitic catalysts are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid backmixing.

The reactor linear velocity, while not being so high that it induces turbulence and excessive backmixing, must be sufficiently high that substantially no catalyst accumulation or buildup occurs in the reactor because such accumulation itself leads to backmixing. (Therefore, the catalyst to oil weight ratio at any position throughout the reactor is about the same as the catalyst to oil weight ratio in the charge.) Stated another way, catalyst and hydrocarbon at any linear position along the reaction path both flow concurrently at about the same linear velocity, thereby avoiding significant slippage of catalyst relative to hydrocarbon. A buildup of catalyst in the reactor leads to a dense bed and backmixing, which in turn increases the residence time in the reactor for at least a portion of the charge hydrocarbon induces aftercracking. Avoiding a catalyst buildup in the reactor results in a very low catalyst inventory in the reactor, which in turn results in a high space velocity. Therefore, a space velocity of over 100 to 120 weight of hydrocarbon per hour per weight of catalyst inventory is highly desirable. The space velocity should not be below 35 and can be as high as 500. Due to the low catalyst inventory and low charge ratio of catalyst to hydrocarbon, the density of the material at the inlet of the reactor in the zone where the feed is charged can be only about 1 to less than 5 pounds per cubic foot, although these ranges are nonlimiting. An inlet density in the zone where the low molecular weight feed and catalyst is charged below 4 or 4.5 pounds per cubic foot is desirable since this density range is too low to encompass dense bed systems which induce backmixing. Although conversion falls off with a decrease in inlet density to very low levels, it has been found the extent of aftercracking to be a more limiting feature than total conversion of fresh feed, even at an inlet density of less than 4 pounds per cubic foot. At the outlet of the reactor the density will be about half of the density at the inlet because the cracking operation produces about a four-fold increase in mols of hydrocarbon. The decrease in density through the reactor can be a measure of conversion.

The above conditions and description of operation are for the preferred fluid bed riser cracking operation. For cracking in the older conventional fluid bed operation or in a fixed-bed operation, the particular reaction conditions are well known in the art and form no part of this invention.

The invention will be further described with reference to the following experimental work.

The fresh catalysts which were evaluated for metals tolerance in accordance with the process of this invention were heat shocked at 1100°F. for one hour, contaminated with nickel and vanadium by impregnation with nickel and vanadium naphthenates, followed by a calcination at 1000°F. (537.8°C.) for 10 hours and a steam treatment at 1350°F. (732.2°C.) for 10 hours. As noted earlier, the average pore radii were determined after calcination but before the steam treatment. In the Tables below, the contaminated catalysts are defined as containing a given amount of "Ni Equivalents, ppm," and this term means the total ppm of nickel plus one-fifth of the total ppm of vanadium by weight deposited on the catalyst by impregnation with the nickel and vanadium naphthenates. Fresh catalysts synthetically contaminated by this technique were found to display activity characteristics very similar to those of equilibrium catalysts contaminated by on-stream usage. The excellent activity correlation of "in situ" and synthetically contaminated cracking catalysts is shown on FIG. 2 attached.

Figure 2:
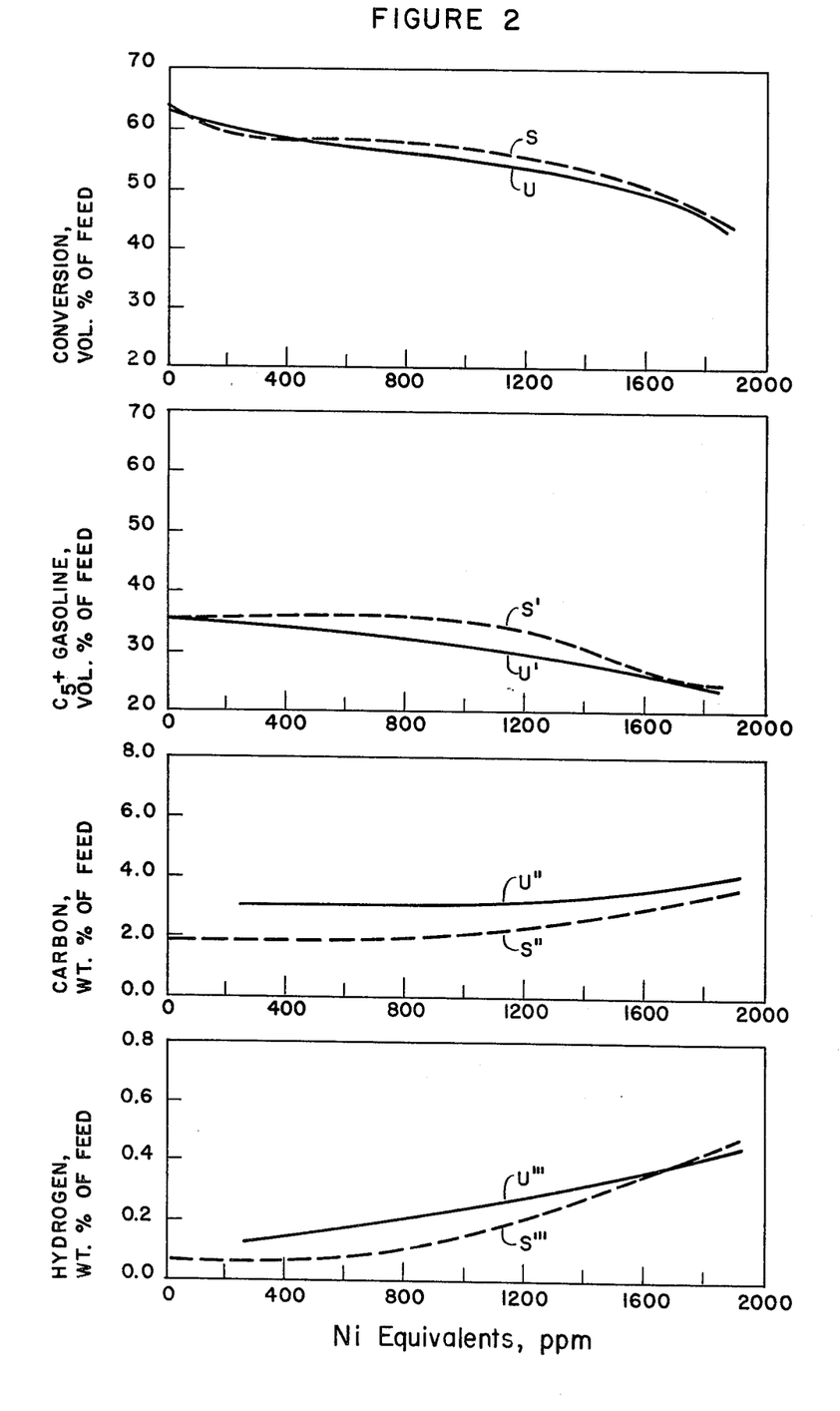

Referring to FIG. 2, all of the data were obtained using a standard commercially available cracking catalyst whose as received properties are shown in Table I below:

TABLE I

| Catalyst: | Fresh standard composite cracking catalyst consisting of about 10 weight percent zeolite having cracking characteristics dispersed in an halloysite matrix |
|---|---|
| MAT Activity | 62% |
| Total Pore Volume: | 0.27 cc/g |
| Surface Area: | 221 m²/g |

The "MAT Activity" was obtained by the use of a microactivity test (MAT) unit similar to the standard Davison MAT (see Ciapetta, F. C. and Handerson, D. S.,"*Oil & Gas Journal*, 65, 88 (1967). All catalyst samples were tested at 900°F. (482.2°C.) reaction temperature; 15 weight hourly space velocity; 80 seconds of catalyst contact time; and a catalyst to oil ratio of 2.9. The charge stock was a Kuwait gas oil having a boiling range of 500°F. to 800°F. (260°C. to 426.7°C.). Inspections of this Kuwait gas oil are shown on Table II below.

TABLE II

| KUWAIT GAS OIL INSPECTIONS | |
|---|---|
| Stock Identification | MAT Feedstocks |
| Inspections: | |
| Gravity, API, D-287 | 23.5 |
| Viscosity, SUS D2161, 130°F. | 94.7 |
| Viscosity, SUS D2161, 150°F. | 70.5 |
| Viscosity, SUS D2161 210°F. | 50.8 |
| Pour Point, D97, °F. | +80 |
| Nitrogen, wt % | 0.074 |
| Sulfur, wt % | 2.76 |
| Carbon, Res., D524, wt % | 0.23 |
| Bromine No., D1159 | 5.71 |
| Aniline Point, °F. | 176.5 |
| Nickel, ppm | <0.1 |
| Vanadium, ppm | <0.1 |
| Distillation, D1160 at 760 mm | |
| End Point, °F. | 800 |
| 5 Pct. Cond. | 505 |
| Approx. Hydrocarbon Type Analysis: Vol % | |
| Carbon as Aromatics | 23.1 |
| Carbon as Naphthenes | 10.5 |
| Carbon as Paraffins | 66.3 |

The curves in FIG. 2 designated S, S', S''and S''' refer to the data obtained using a series of standard commercially available cracking catalysts which had been contaminated to metal levels of 600, 850, 1,200 and 1,912 nickel equivalents either by actual use in a commercial FCC unit or by prolonged testing in a pilot plant charging gas oils. The curves designated U, U', U'' and U''' refer to the data obtained using a synthetically contaminated series of the same commercial catalyst. The metal levels used in this series and for the data shown in FIGS. 3–10 are presented in Table III below.

TABLE III

| | Levels of Nickel and Vanadium Deposited on the Fresh Cracking Catalyst Shown in Table I above | | |
|---|---|---|---|
| Level No. | Wt. % Nickel | Wt. % Vanadium | Nickel Equivalents |
| 1 | 0.045 | 0.075 | 600 |
| 2 | 0.06 | 0.125 | 850 |
| 3 | 0.075 | 0.225 | 1200 |
| 4 | 0.17 | 0.106 | 1912 |
| 5 | 0.24 | 0.30 | 3000 |

Since an excellent activity correlation is shown, the synthetic method of metals contamination was used in the data to follow using various pore size matrices.

Several different types of matrix materials were employed in the Examples to follow, and the characteristics of these matrices are shown in Tables IV and V below.

TABLE IV

| | | Matrix Properties After Heat Treatment at 1000°F. for 10 Hours | | |
|---|---|---|---|---|
| Matrix Letter | Matrix Material | Avg.Pore Diameter A | Total Pore Vol. cc/g | Surface Area M²/g |
| A¹ | Halloysite (aluminum silicate clay) | 61.4 | 0.22 | 144 |
| B² | Silica alumina (75% SiO₂; 25% Al₂O₃) | 73 | 0.89 | 487.4 |
| C¹ | Al₂O₃ | 35.7 | 0.36 | 403 |

TABLE IV-continued

| Matrix Letter | Matrix Material | Matrix Properties After Heat Treatment at 1000°F. for 10 Hours | | |
|---|---|---|---|---|
| | | Avg. Pore Diameter A | Total Pore Vol. cc/g | Surface Area M²/g |
| D[1] | Treated aluminum silicate clay (60% $SiO_2$; 40% $Al_2O_3$) | 95.4 | 0.36 | 151 |
| E[2] | Silica alumina (72% $SiO_2$; 28% $Al_2O_3$) | 143.8 | 0.87 | 242 |
| F[1] | $Al_2O_3$ | 100.6 | 0.56 | 223.3 |
| G[1] | $Al_2O_3$ | 139.5 | 0.63 | 180.7 |

[1] crystalline
[2] amorphous

TABLE V

| Matrix Material from Table IV | A | B | C | D | E | F | G |
|---|---|---|---|---|---|---|---|
| Pore Dia. A | Vol % | Vol % | Vol % | Vol % | Vol % | Vol % | Vol % |
| 600–500 | 3.8 | 0.6 | 0.4 | 6.0 | 8.0 | 1.9 | 1.0 |
| 500–400 | 6.1 | 1.0 | 0.7 | 9.3 | 14.3 | 4.6 | 2.3 |
| 400–300 | 7.5 | 1.7 | 1.2 | 12.6 | 17.9 | 10.6 | 7.6 |
| 300–200 | 11.2 | 2.7 | 2.4 | 19.1 | 21.7 | 26.3 | 32.9 |
| 200–180 | 3.3 | 0.8 | 0.8 | 4.0 | 4.4 | 5.9 | 8.2 |
| 180–160 | 3.7 | 1.2 | 1.3 | 6.0 | 5.1 | 6.5 | 9.7 |
| 160–140 | 4.3 | 1.6 | 1.6 | 5.5 | 4.6 | 5.1 | 8.9 |
| 140–120 | 5.6 | 4.7 | 2.3 | 6.9 | 4.4 | 5.4 | 7.8 |
| 120–100 | 4.6 | 8.3 | 4.1 | 5.5 | 4.2 | 4.9 | 6.3 |
| 100–90 | 3.4 | 7.3 | 4.1 | 4.1 | 2.0 | 2.1 | 6.1 |
| 90–80 | 3.4 | 9.2 | 6.0 | 3.0 | 2.4 | 2.4 | |
| 80–70 | 3.5 | 10.5 | 10.1 | 3.7 | 2.2 | 2.7 | 5.1 |
| 70–60 | 4.4 | 11.2 | 12.8 | 3.3 | 2.0 | 2.6 | |
| 60–50 | 5.5 | 13.0 | 14.5 | 4.1 | 2.5 | 4.7 | 4.2 |
| 50–40 | 7.3 | 12.3 | 16.8 | 3.3 | 2.5 | 6.9 | |
| 40–30 | 9.6 | 12.2 | 16.7 | 3.6 | 1.7 | 7.4 | 0.0 |
| 30–20 | 12.1 | 1.6 | 4.4 | 0.0 | 0.0 | 0.0 | |
| 20–14 | 0.5 | 0.0 | 0.0 | 0.0 | 0.0 | 0.0 | 0.0 |
| | 29.9* | 26.1* | 37.9* | 6.9* | 4.2* | 14.3* | 4.2* |

*Volume % of pores having pore diameter of less than 50 A.

For a comparison testing of the matrix materials whose characteristics are shown in Tables IV and V above, a rare earth exchanged zeolite was dispersed throughout a given matrix prior to impregnation of the metal contaminants. The zeolite was a rare earth exchanged Y-type zeolite which was prepared by exchanging a commercially available Y-type zeolite (SK-40 obtained from Union Carbide Corporation) with a natural mixture of rare earth chlorides until the residual sodium content of the zeolite was 0.7 weight percent or less. The zeolite had an effective pore diameter of about 8 to 10 A and an average particle size of 1 to 2 microns. The zeolite was dispersed in the matrix by a 24-hour mechanical mixing of finely divided portions of zeolite and matrix followed by forming in a press and sieving to 10–20 mesh size granules.

The zeolite content in the composited catalysts made from matrices A, B, D, E and G was 12 weight percent in order for the final composited catalyst to compare in its initial activity with the commercially available catalyst shown in Table I.

The composited catalyst using alumina matrix C required 22 weight percent zeolite to obtain comparable cracking activity since the alumina matrix per se is essentially devoid of cracking activity.

Composited catalysts using alumina matrix F were prepared containing both 12 and 22 weight percent zeolite, the lower zeolite content producing, of course, a final catalyst having lower initial cracking activity.

Figure 8:
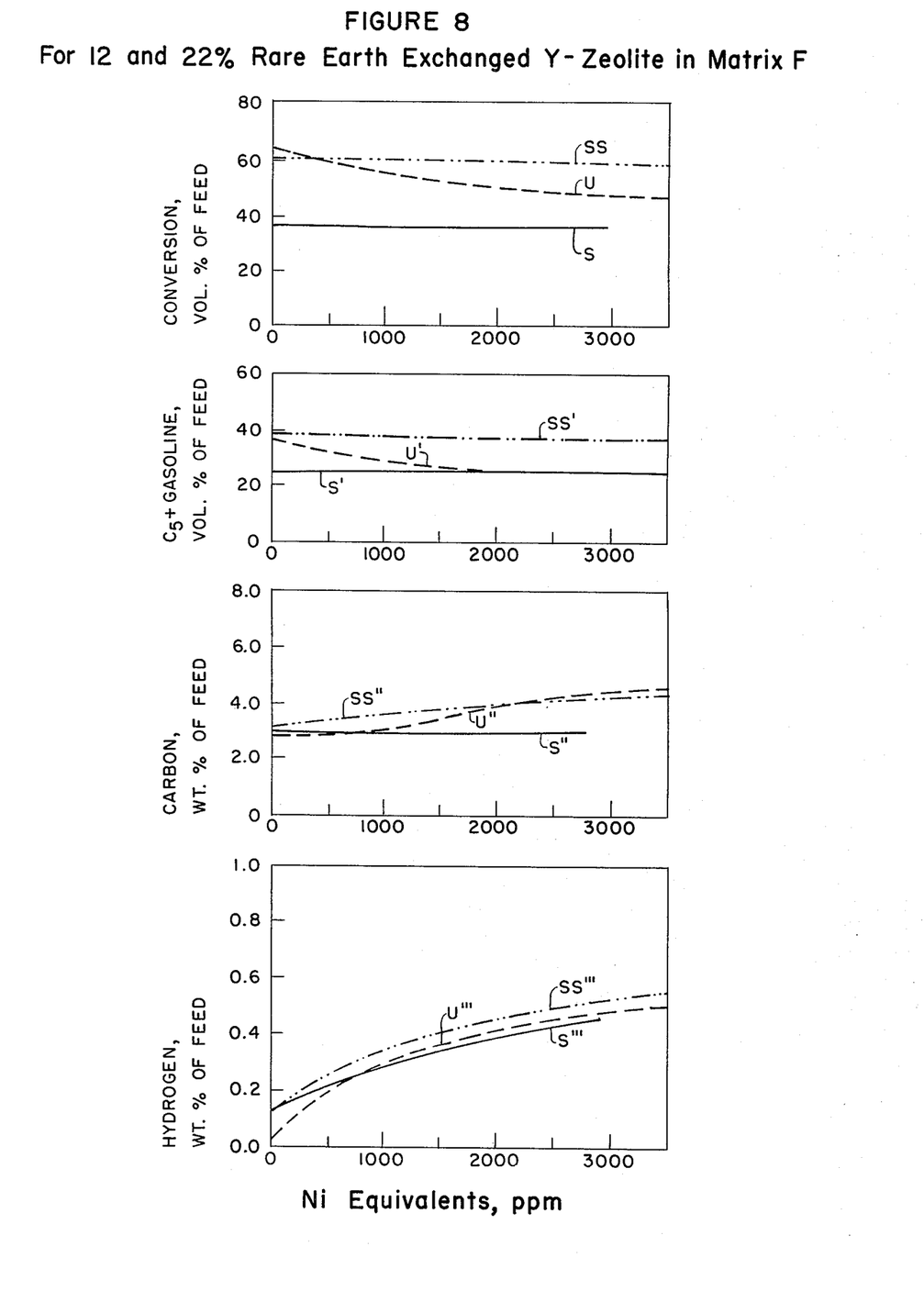
Figure 9:
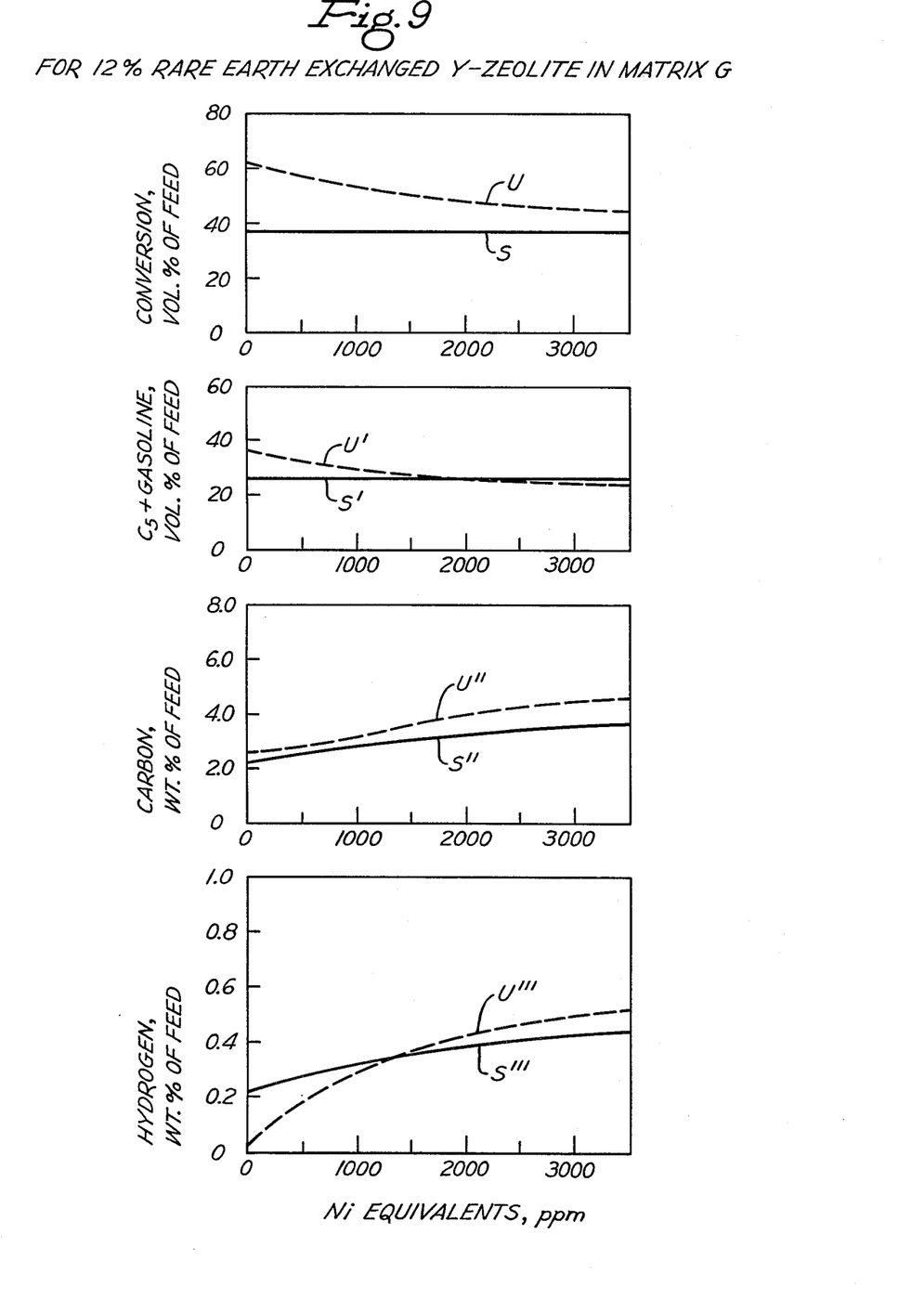

The metals tolerance of these composited catalysts was compared to the metals tolerance of a commercially available zeolite-matrix composited catalyst whose properties are shown in Table I. The data are summarized in a series of FIGS. 3 through 9 which contain the data plotted as curves labeled S or various primed S's using composited catalysts prepared from matrices A through G, respectively. In FIG. 8, the curves labeled S represent the data for the 12% zeolite catalyst, and the curves labeled SS represent the data for the 22% zeolite catalyst. In addition, each of the Figures contains reference curves labeled U or various primed U's which represent data using the commercially available zeolite-matrix composited catalyst whose properties are shown in Table I above and which were synthetically contaminated.

Figure 3:
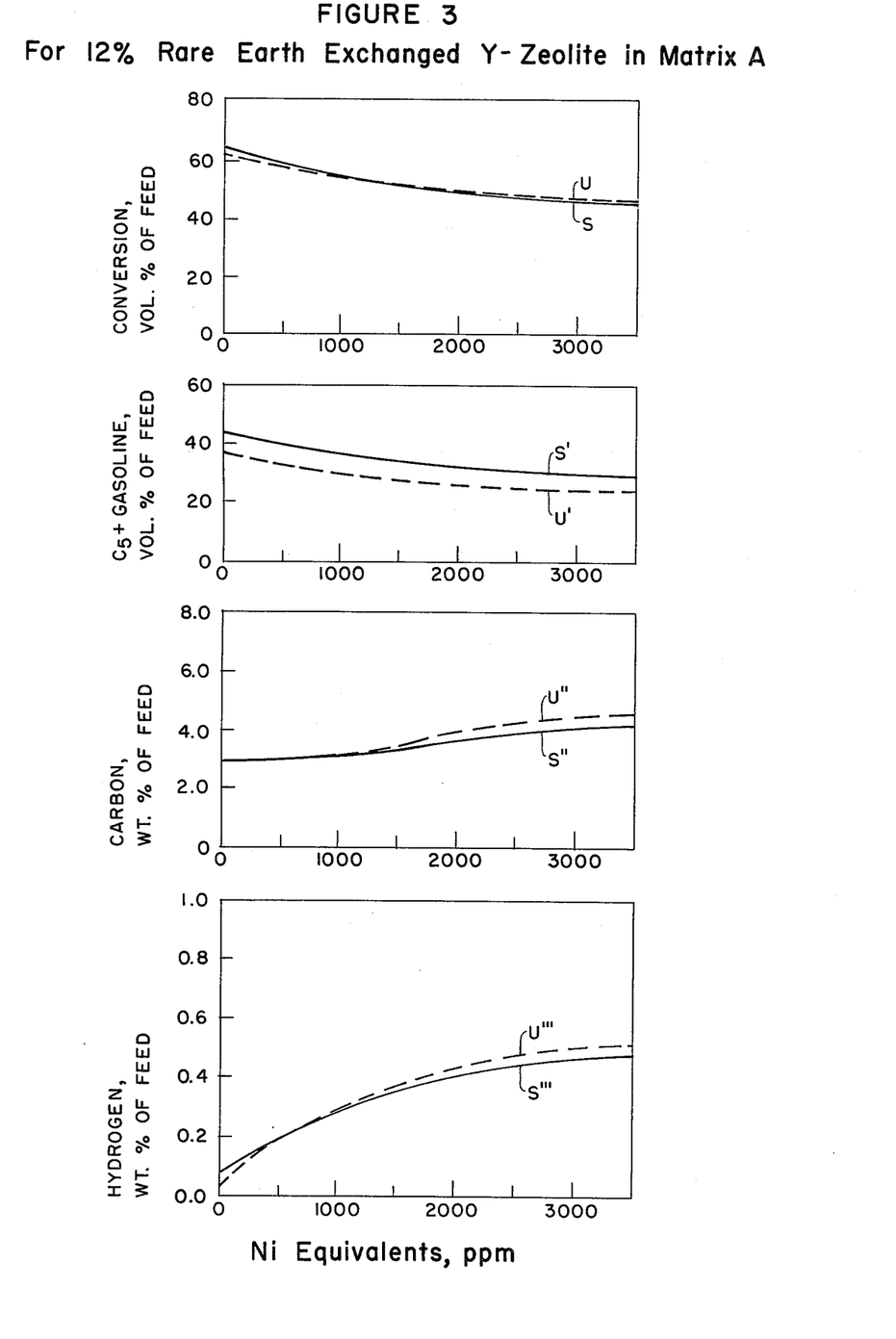
Figure 4:
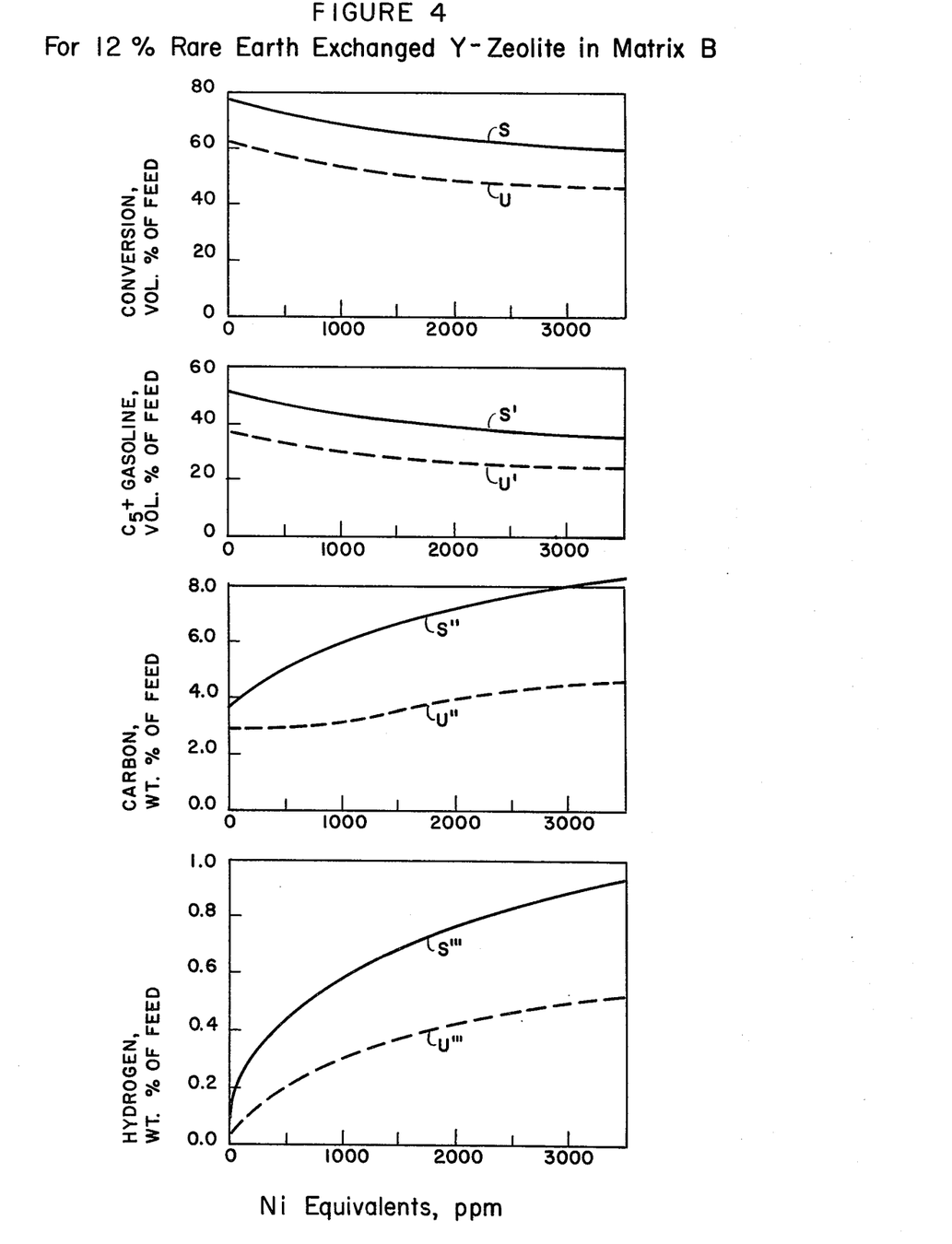
Figure 5:
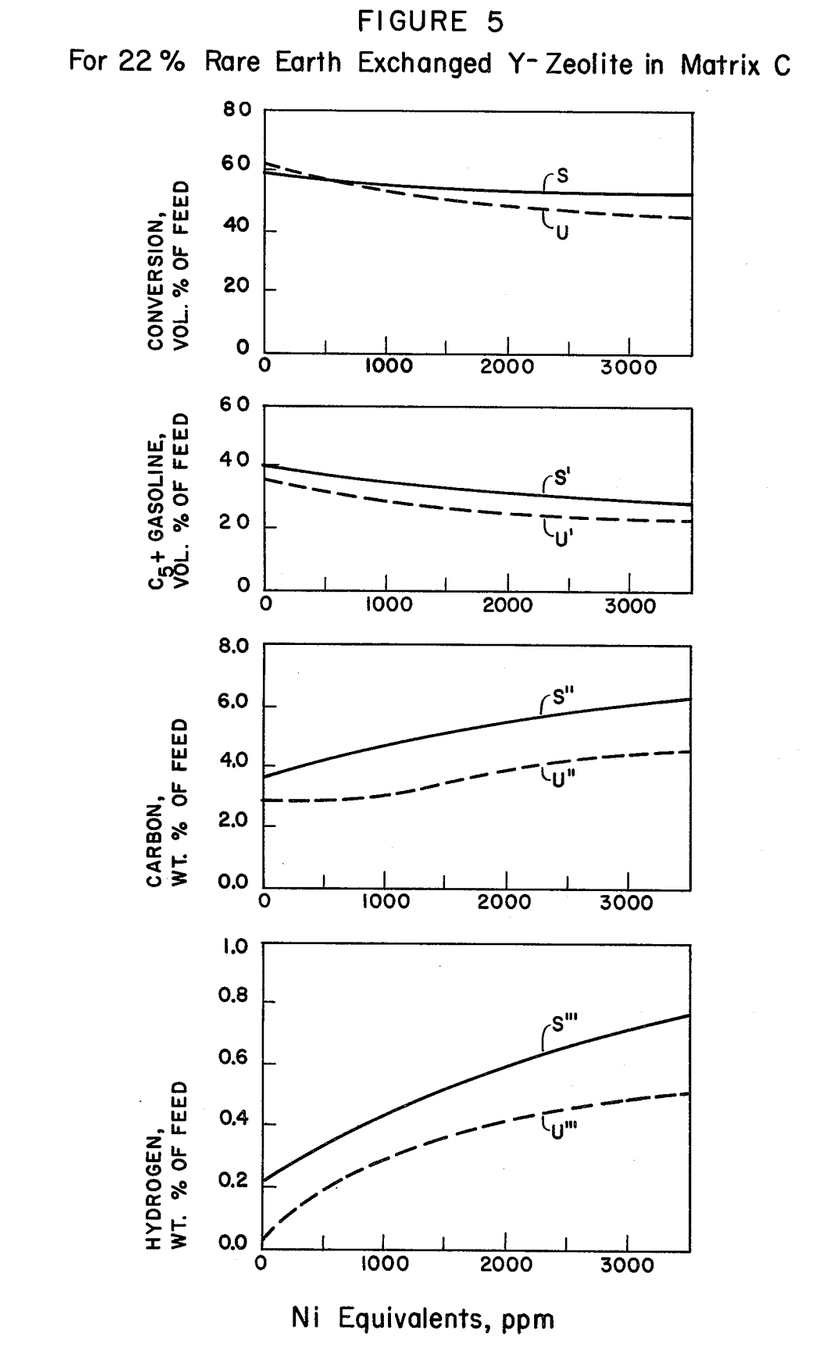
Figure 6:
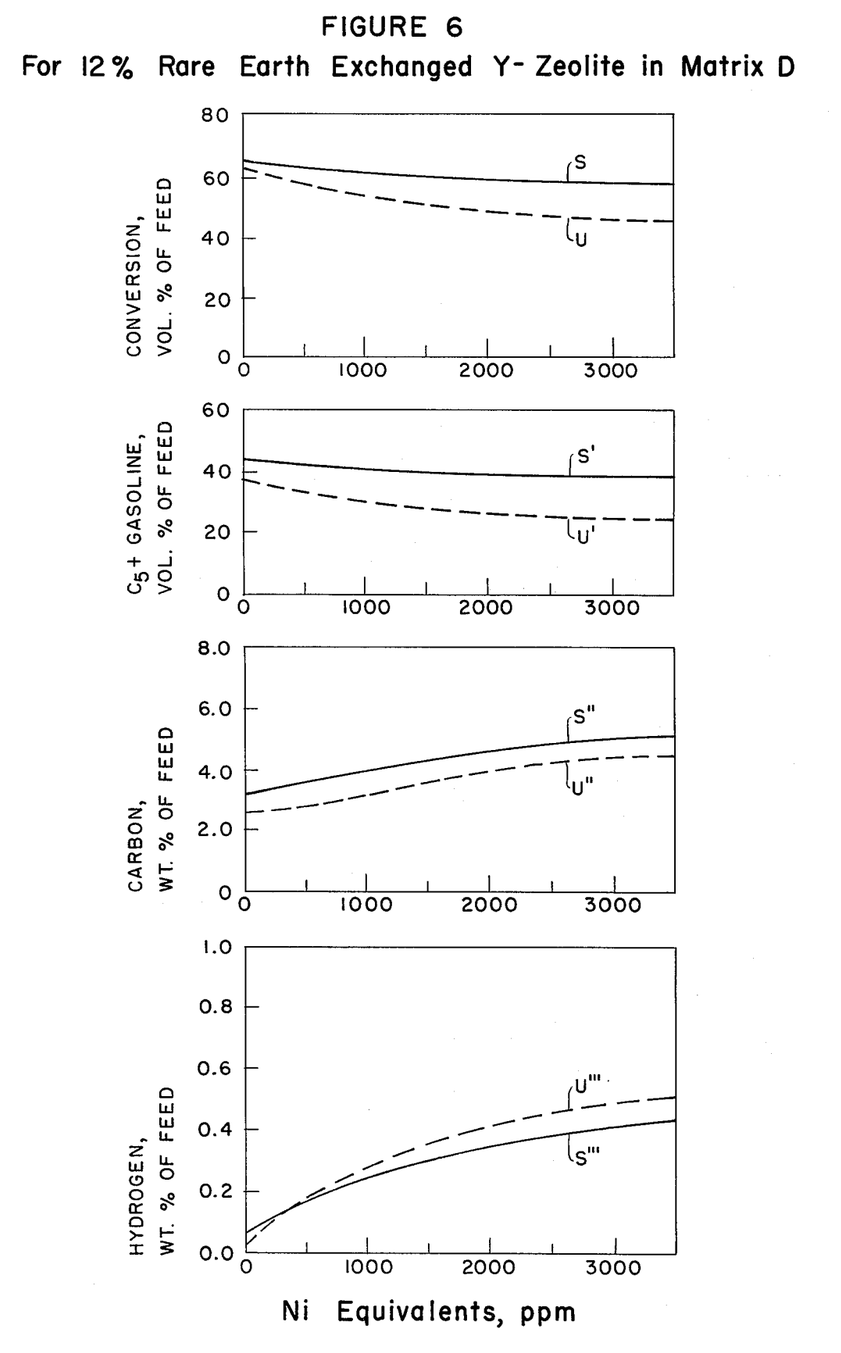
Figure 7:
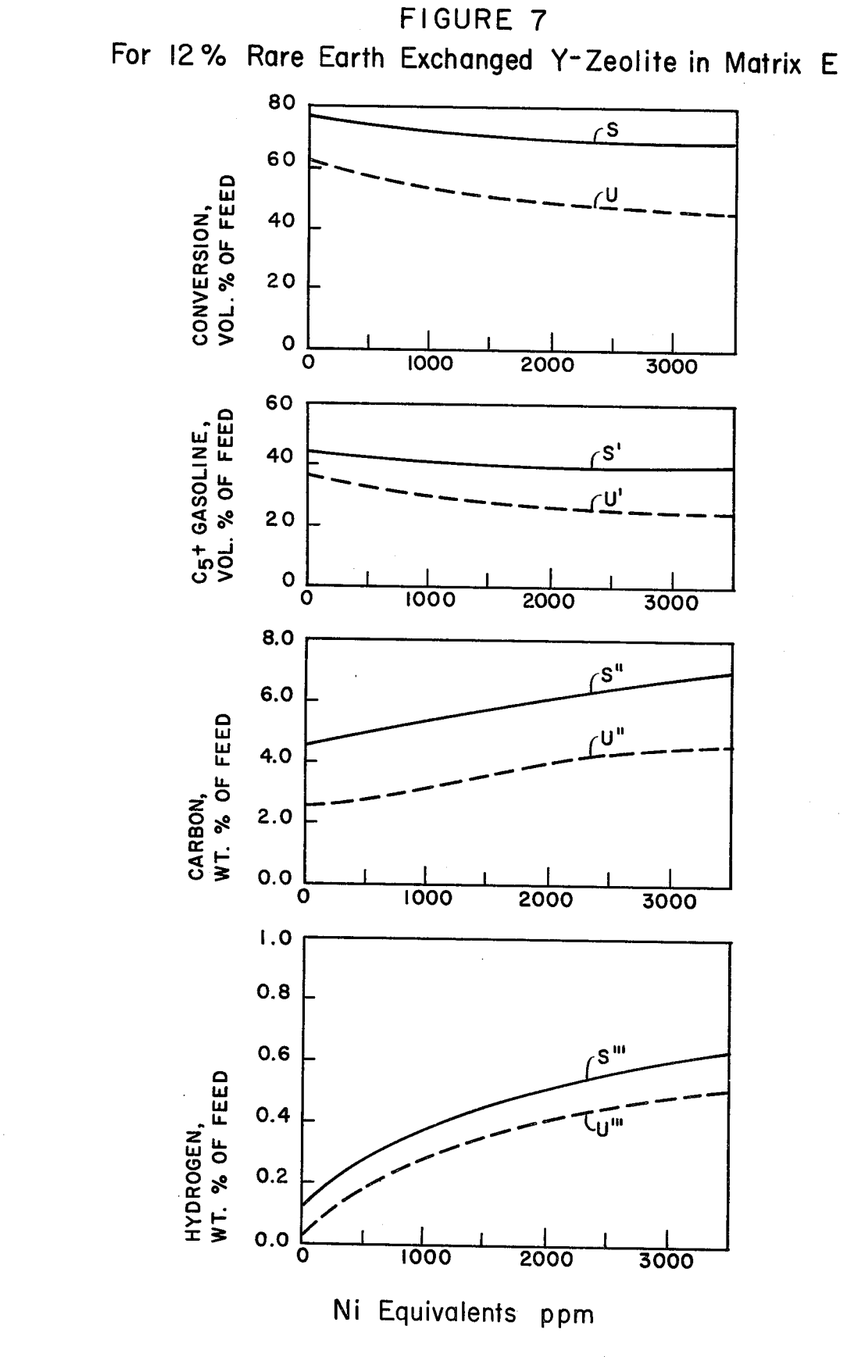

Referring to FIGS. 3, 4 andd 5, it is evident the metals tolerance of these catalysts using relatively small pore matrices is no better than the standard catalyst. On the other hand, the use of matrix materials D, E, F and G (defined as large pore materials) definitely results in improved metals tolerance as shown in FIGS. 6, 7, 8 and 9.

Referring to FIGS. 6, 7, 8 and 9, the results show that with large pore matrices, the rate of deactivation with metals deposition is significantly reduced such that conversion and gasoline yields are essentially unaffected over the time period studied. In addition, a comparison of FIGS. 6, 7, 8 and 9 shows that a preferred large pore matrix should contain a high alumina content to minimize coke and hydrogen production. Further, FIG. 8 shows that improved metals tolerance is not due to an increase in the zeolite content because the conversion lines out in both the use of the 12 and 22 weight percent zeolite catalysts but at different levels depending on the zeolite content.

Figure 10:
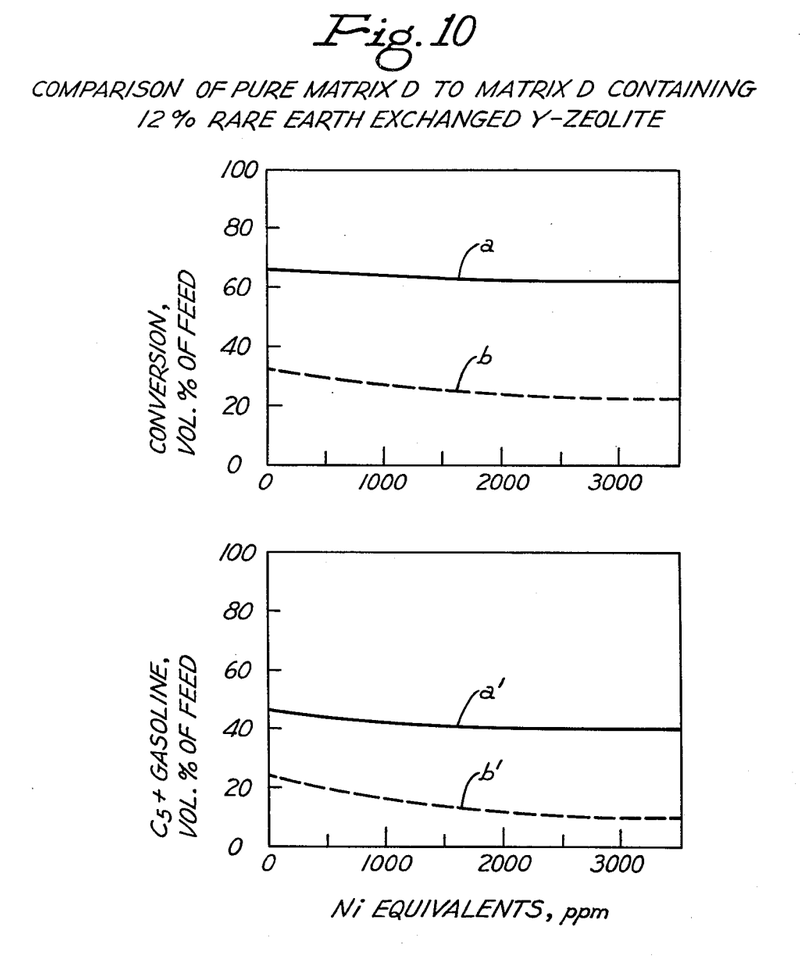

In FIG. 10, the metals tolerance of matrix D (see Tables IV and V above) promoted with 12% rare earth exchanged Y-zeolite (SK-40 obtained from Union Carbide Corporation) is compared to the metals tolerance of the pure matrix. In FIG. 10, the curves designated *a* and *a'* are for the matrix D promoted with 12% rare earth exchanged Y-zeolite; the curves marked b and b' are for the pure matrix D. FIG. 10 shows that, by itself, matrix D is very susceptible to deactivation by metal deposition but when promoted with the zeolite, the composited catalyst is only slightly affected by an increasing metals content in the charge stock. These results suggest that the role of the large pored matrix is to behave as a "sink" for the metal contaminants, thereby prolonging the useful life of the more active zeolite component.

Resort may be had to such variations and modifications as fall within the spirit of the invention and the scope of the appended claims.

We claim:

1. A process for the catalytic cracking of a high metals content charge stock having a total metals concentration as calculated in accordance with the relationship $$10\,[Ni] + [V] + [Fe] \geq 10$$

where [Ni], [V] and [Fe] are the concentrations of nickel, vanadium and iron, in parts per million by weight, which comprises contacting said charge stock in the absence of added hydrogen under catalytic cracking conditions with a catalyst comprising from 1 to 40 weight percent of a zeolite having cracking characteristics dispersed in a refractory metal oxide matrix, said matrix having a pore size distribution such that less than 20 volume percent of the pores have a pore diameter of less than 50 A and the average pore diameter is at least 90 A.

2. A process according to claim 1 wherein the matrix, in addition, has less than five volume percent of the pores with a pore diameter above 600 A and has an average pore diameter from 90 A to 350 A.

3. A process according to claim 2 wherein the matrix has at least 25 percent by weight of alumina.

4. A process according to claim 3 wherein the matrix is alumina.

5. A process for the fluid catalytic cracking of a high metals content charge stock having a total metals concentration as calculated in accordance with the relationship $$10\,[Ni] + [V] + [Fe] \geq 10$$

where [Ni], [V] and [Fe] are the concentrations of nickel, vanadium and iron in parts per million by weight, which comprises contacting said charge stock in the absence of added hydrogen under catalytic cracking conditions with a catalyst comprising from 1 to 40 weight percent of a zeolite having cracking characteristics dispersed in a refractory metal oxide matrix, said matrix having a pore size distribution such that less than 20 volume percent of the pores have a pore diameter of less than 50 A and the average pore diameter is at least 90 A.

6. A process according to claim 5 wherein the matrix has at least 50% alumina and an average pore diameter from 90 A to 350 A.

7. A process according to claim 6 wherein the charge stock is a petroleum charge stock boiling above 650°F. at atmospheric pressure.

8. A process according to claim 7 wherein the charge stock is a residual petroleum charge stock.

9. A process according to claim 7 wherein the matrix is alumina.

10. A process according to claim 7 wherein the zeolite is a synthetic faujasite present in from 5 to 25 weight percent of the final catalyst.

11. A process in accordance with claim 10 wherein the matrix is substantially crystalline.

12. A process for the catalytic cracking of a high metals content charge stock having a total metals concentration as calculated in accordance with the relationship $$10\,[Ni] + [V] + [Fe] \geq 10$$

where [Ni], [V] and [Fe] are the concentrations of nickel, vanadium and iron in parts per million by weight, which comprises contacting said charge stock in the absence of added hydrogen under catalytic cracking conditions with a catalyst comprising from 1 to 40 weight percent of a zeolite having cracking characteristics dispersed in a refractory metal oxide matrix consisting essentially of alumina and silica, said matrix having a pore size distribution such that less than 20 volume percent of the pores have a pore diameter of less than 50 A and the average pore diameter is at least 90 A.

13. A process in accordance with claim 12 wherein the refractory metal oxide contains at least 25 percent by weight of alumina.

14. A process in accordance with claim 13 wherein the matrix is substantially crystalline.

15. A process in accordance with claim 13 wherein the matrix is substantially amorphous.

16. A process in accordance with claim 1 wherein the zeolite is at least one synthetic faujasite selected from the group consisting of type Y and type X.

17. A process in accordance with claim 16 wherein the X and Y zeolites are rare earth exchanged.

18. A process in accordance with claim 12 wherein the zeolite is at least one rare earth exchanged faujasite selected from the group consisting of type X and type Y.

19. A process in accordance with claim 18 wherein the charge stock is a petroleum charge stock boiling above 650°F. at atmospheric pressure.

20. A process for the fluid catalytic cracking of a high metals content charge stock having a total metals concentration as calculated in accordance with the relationship $$10\,[Ni] + [V] + [Fe] \geq 10$$

where [Ni], [V] and [Fe] are the concentrations of nickel, vanadium and iron in parts per million by weight, which comprises contacting said charge stock in the absence of added hydrogen under catalytic cracking conditions with a catalyst comprising from 1 to 40 weight percent of a zeolite dispersed in a refractory metal oxide matrix, said matrix having a pore size distribution such that less than 20 volume percent of the pores have a pore diameter of less than 50 A and the average pore diameter is at least 90 A.

21. A process in accordance with the claim 20 wherein the zeolite has a particle size from 1 to 2 microns.

22. A process for the fluid catalytic cracking of a high metals content charge stock having a total metals concentration as calculated in accordance with the relationship $$10\,[Ni] + [V] + [Fe] \geq 10$$

where [Ni], [V] and [Fe] are the concentrations of nickel, vanadium and iron in parts per million by weight, which comprises contacting said charge stock in the absence of added hydrogen under catalytic cracking conditions with a catalyst consisting essentially of from 1 to 40 weight percent of a zeolite dispersed in a refractory metal oxide matrix containing at least a portion of alumina, said matrix having a pore size distribution such that less than 20 volume percent of the pores have a pore diameter of less than 50 A and the average pore diameter is at least 90 A.

23. A process in accordance with claim 22 wherein at least a portion of said matrix is an aluminum silicate clay.

24. A process in accordance with claim 23 wherein said zeolite is at least one rare earth exchanged faujasite selected from the group consisting of type Y and type X.

25. A process for the fluid catalytic cracking of a high metals content charge stock having a total metals concentration as calculated in accordance with the relationship $$10[Ni] + [V] + [Fe] \geq 10$$

where [Ni], [V] and [Fe] are the concentrations of nickel, vanadium and iron in parts per million by weight, which comprises contacting said charge stock in the absence of added hydrogen under catalytic cracking conditions with a catalyst comprising from 1 to 40 weight percent of a zeolite dispersed in a refractory metal oxide matrix, said matrix having (i) an average pore diameter sufficiently large and (ii) a sufficiently small percentage of pores having a diameter of less than 50 A corresponding to a dried matrix calcined in air at 1000°F. for 10 hours having (i) an average pore diameter of at least 90 A and (ii) less than 20 volume percent of its pores with a diameter of less than 50 A.

26. A process according to claim 25 wherein the matrix has an averate pore diameter from 100 A to 350 A.

27. A process according to claim 26 wherein the refractory metal oxide matrix consists essentially of alumina and silica.

28. A process for the catalytic cracking of a high metals content charge stock having a total metals concentration as calculated in accordance with the relationship $$10[Ni] + [V] + [Fe] \geq 10$$

where [Ni], [V] and [Fe] are the concentrations of nickel, vanadium and iron, in parts per million by weight, which comprises
contacting said charge stock in the absence of added hydrogen under catalytic cracking conditions
with a catalyst comprising from 1 to 40 weight percent of a zeolite having cracking characteristics dispersed in a refractory metal oxide matrix, said matrix having (i) an average pore diameter sufficiently large and (ii) a sufficiently small percentage of pores having a diameter of less than 50 A corresponding to a dried matrix calcined in air at 1000°F. for 10 hours having (i) an average pore diameter of at least 90 A and (ii) less than 20 volume percent of its pores with a diameter of less than 50 A.
and where in said process the diminution in volume percent $C_{5+}$ gasoline produced based on the conversion of said charge stock is less than 12 volume percent over a time period such that the metal deposition from said charge stock onto said catalyst is from 0 to 3000 nickel equivalents, said nickel equivalents being the total ppm of nickel plus one-fifth of the total ppm of vanadium by weight.

29. A process according to claim 28 wherein the refractory metal oxide matrix consists essentially of alumina and silica.

* * * * *